Figure 1:
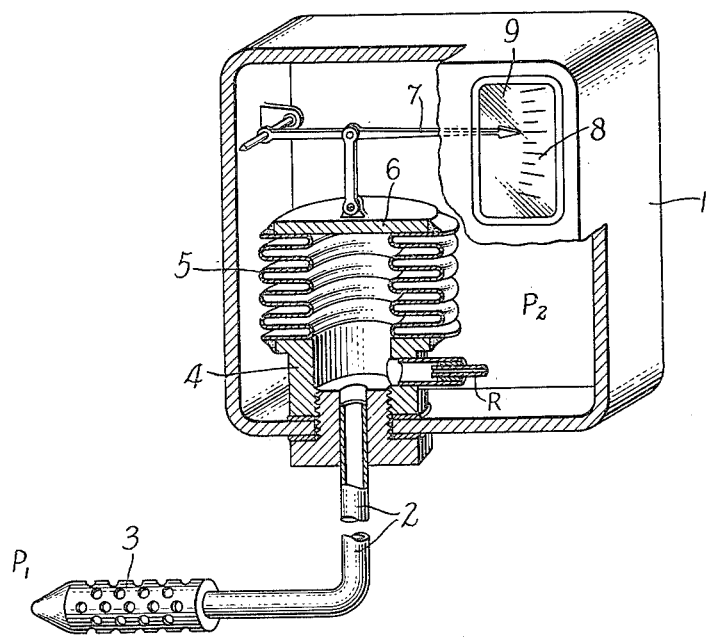

July 20, 1948.   G. A. PHILBRICK ET AL   2,445,335
ALTITUDE AND RATE OF CHANGE MEASURING DEVICE
AND CONTROL FOR AIRCRAFT
Filed May 3, 1941                                4 Sheets-Sheet 1

INVENTORS
George A. Philbrick
Allan R. Catheron
BY
Blair, Curtis & Hayward
ATTORNEYS July 20, 1948.  G. A. PHILBRICK ET AL  2,445,335
ALTITUDE AND RATE OF CHANGE MEASURING DEVICE
AND CONTROL FOR AIRCRAFT Filed May 3, 1941  4 Sheets-Sheet 2

INVENTORS
George A. Philbrick
Allan R. Catheron
BY
Blair, Curtis & Hayward
ATTORNEYS

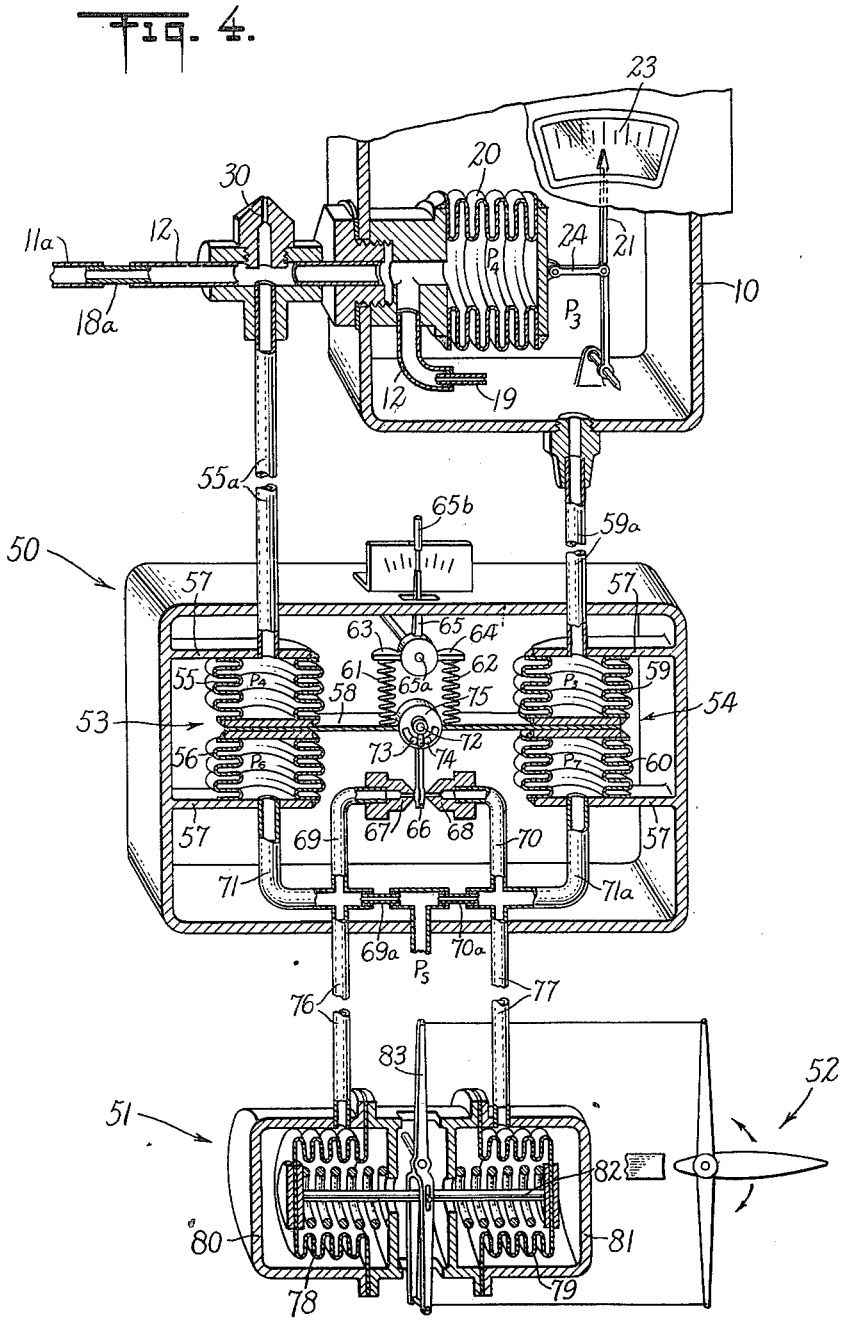

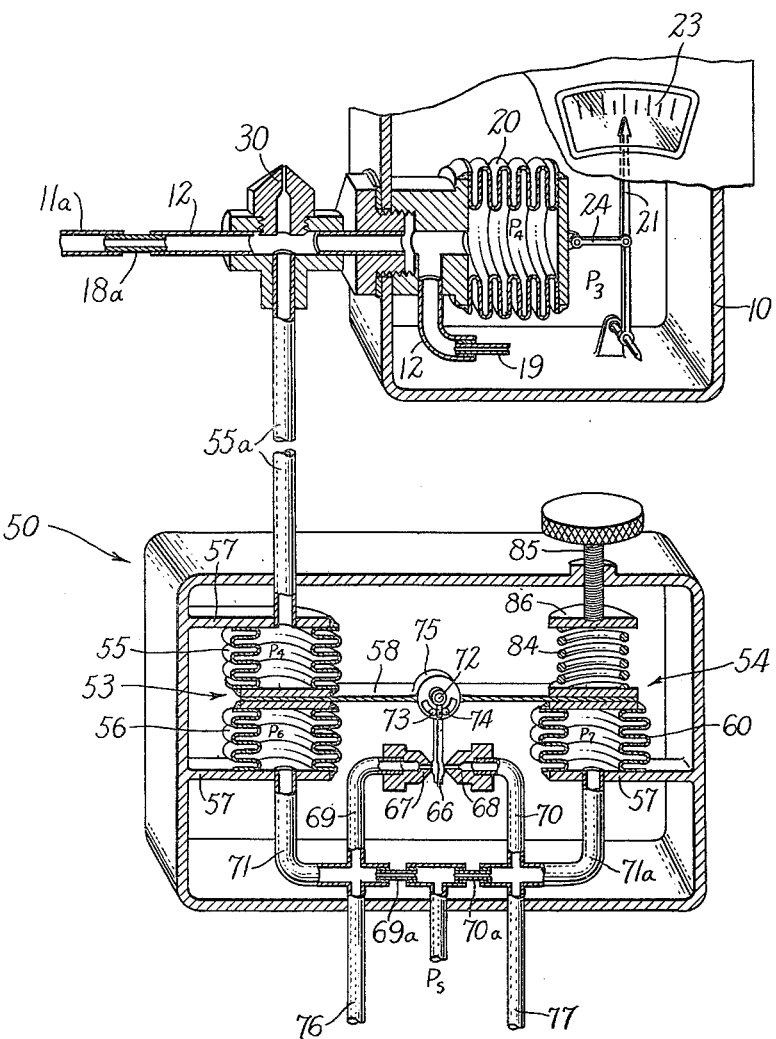

Patented July 20, 1948

2,445,335

UNITED STATES PATENT OFFICE 2,445,335

ALTITUDE AND RATE OF CHANGE MEASURING DEVICE AND CONTROL FOR AIRCRAFT

George A. Philbrick, Sharon, and Allan R. Catheron, Needham, Mass., assignors to The Foxboro Company, Foxboro, Mass., a corporation of Massachusetts Application May 3, 1941, Serial No. 391,678

15 Claims. (Cl. 244—78)

The present invention relates to altitude measurement and rate of climb measurement and more particularly to improved method and apparatus for making such measurements and for utilizing such measurements for controlling aircraft, and other media.

The conventional altitude meter and rate of climb meter utilizing the change of atmospheric pressure with change of altitude to determine altitude or rate of climb have inherent inaccuracies, and one of the objects of the present invention is to provide an improved method and apparatus for obtaining substantially instantaneous altitude and rate of climb measurements in which inaccuracies formerly accepted as inevitable are eliminated. Other objects will be in part obvious and in part pointed out hereinafter.

Figure 2:
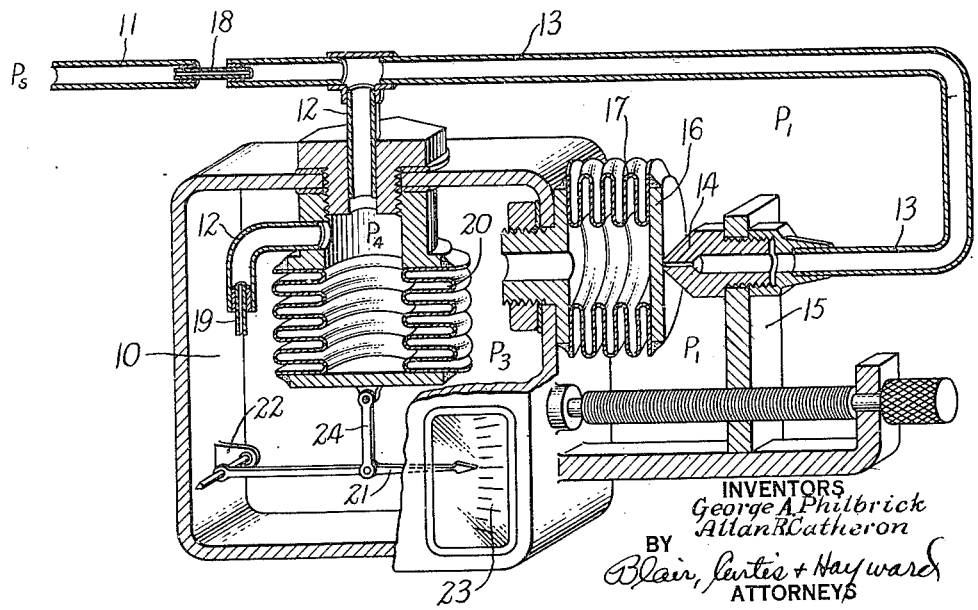
Figure 3:
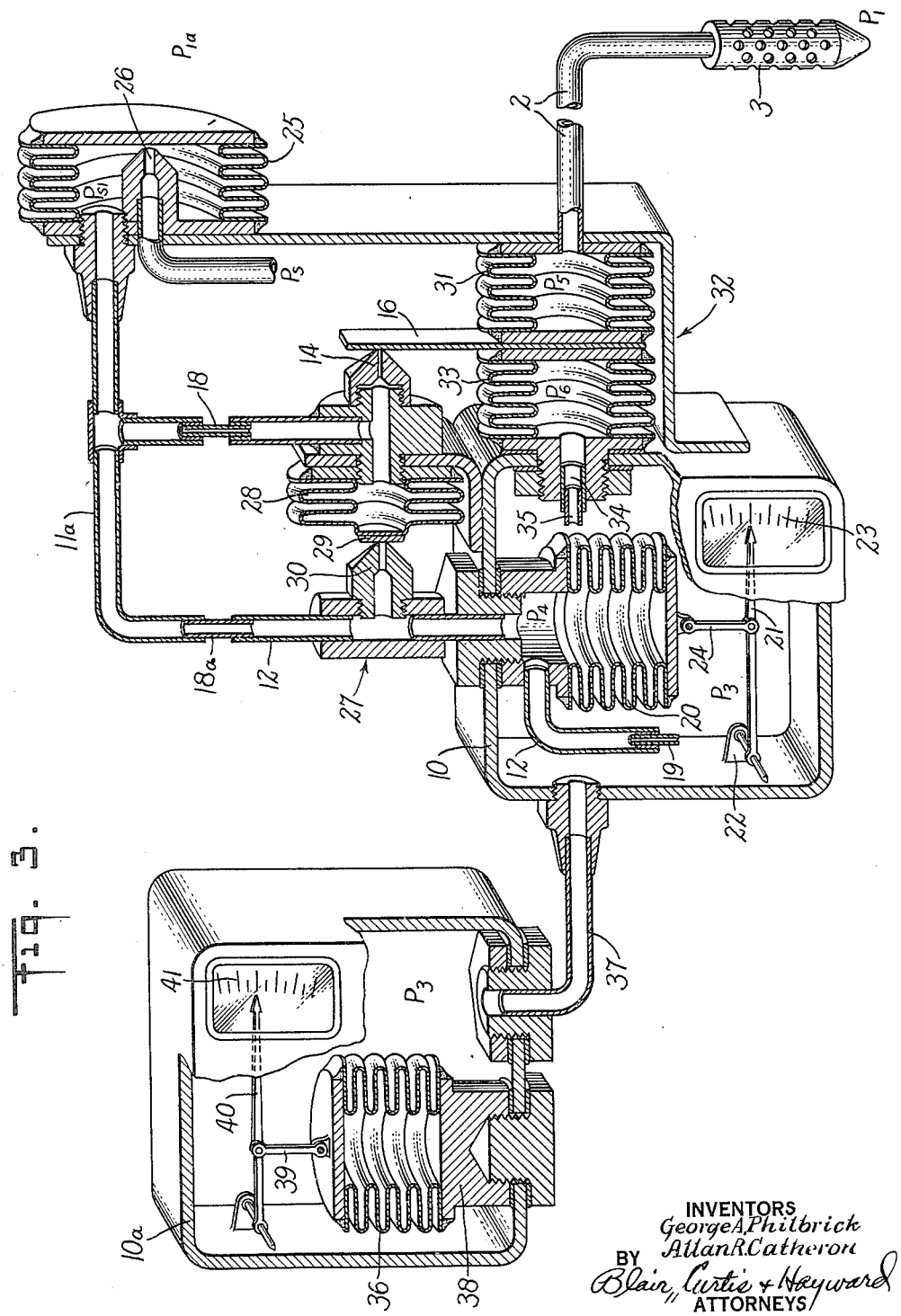

In the drawings,

Figure 1 diagrammatically represents a conventional rate of climb meter;

Figure 2 diagrammatically represents a rate of climb instrument embodying the present invention;

Figure 3 diagrammatically represents a rate of climb indicator and an altitude indicating instrument embodying the present invention; and Figures 4 and 5 diagrammatically represent a control system embodying the invention.

A brief review of the operation of, and of the inherent inaccuracies in, the present conventional rate of climb indicator will aid in an understanding of the advance made by the present invention.

Referring to Figure 1, the conventional rate of climb meter is diagrammatically shown, without, however, the usual means for compensating for temperature and altitude errors. Such a meter utilizes the change in atmospheric pressure that takes place as an aircraft changes its altitude. A pneumatic capacitance or chamber 1 is connected with the atmospheric or barometric pressure through a restriction or pneumatic resistance R so that the pressure in the chamber may equalize with the atmospheric pressure when the latter is not changing. But when the atmospheric pressure is changing, the restriction causes the pressure in the chamber to lag behind the changing atmospheric pressure so that a pressure difference exists between that in the chamber and that of the atmosphere at least so long as the latter is changing. This pressure difference is taken as an indication of the rate of atmospheric pressure change and therefore as the rate of climb or descent.

Referring in more detail to the drawing of Figure 1, the pneumatic capacity chamber is connected through a restriction R and a tube 2 to the atmospheric pressure. The tube 2 terminates in a static pressure head 3 and extends to a suitable place on the aircraft where an accurate barometric pressure exists. Supported in the chamber 1 on a bracket 4 is a spring-loaded bellows 5 having a free or movable end 6, i. e. the free end of the bellows 5 in moving away from the fixed end moves against a spring restricting action. The bellows is directly connected through the tube 2 to the atmosphere without any deliberately inserted resistance. The bellows, therefore, is exposed on one side to the atmospheric pressure $P_1$ and on the other to the chamber pressure $P_2$, and expands and contracts in proportion to the pressure difference $(P_1-P_2)$. The bellows 5 is provided with a suitable spring characteristic selected in accordance with the range of movement desired for the corresponding expected range of pressure difference $(P_1-P_2)$.

The chamber 1 is, of course, pneumatically tight except for its connection to the atmosphere through the resistance R. The free end 6 of the bellows 5 operates a suitable index pointer 7 which cooperates with a scale 8 visible through a window 9 to indicate the degree of expansion or contraction of the bellows 5 and so the rate of climb or descent.

An inherent inaccuracy of this instrument is that it actually measures the rate of change of the pressure $P_2$ in the chamber 1 instead of measuring the rate of change of the pressure $P_1$. Further, the pressure $P_2$ lags behind the pressure $P_1$ when the latter has a rate of change. Thus this instrument has an inherent "lag" which renders it inaccurate. In other words, it takes time for an accurately indicative pressure difference $(P_1-P_2)$ to be established between the changing chamber pressure $P_2$ and the changing atmospheric pressure $P_1$. Thus, assuming that $P_1$ is suddenly given a constant rate of change, time is required for the pressure $P_2$ to acquire the same rate of change and for the pressure difference $(P_1-P_2)$ to become constant, and since it is $(P_1-P_2)$ that is used to indicate the rate of change of $P_1$, time is required to elapse before the instrument will indicate the rate of change of $P_1$.

The larger the volume of the chamber 1 or the greater the resistance R, the greater is this lag. But if the volume is reduced or the restriction is reduced, then the pressure difference applied to the bellows 5 for a given rate of change of pressure $P_1$ is reduced, and the large multiplication of motion then necessary to obtain a readable indication of the pressure difference introduces other inaccuracies.

In the present invention this inherent inaccuracy is substantially minimized by utilizing an auxiliary source of power to maintain a condition, such as pressure, equal to or in fixed linear relationship with the atmospheric pressure. Then the rate of change of the auxiliary condition due to rate of change of altitude is obtained by effectively measuring the potential or the flow required to maintain the predetermined relationship between said condition and the changing atmospheric pressure. With this method of measurement there is no undesirable inherent lag and the rate of change of the atmospheric pressure and so the rate of climb or descent is substantially instantaneously measured.

Referring to Figure 2, in which one illustrative apparatus for carrying out the method of the invention is diagrammatically disclosed, mechanism is provided for maintaining a pneumatic pressure $P_3$ in a chamber 10 in a predetermined relationship to the atmospheric pressure $P_1$. In the present embodiment the relationship is a linear relationship which is a constant pressure difference. This mechanism includes a suitable source of auxiliary supply pressure (in the present embodiment a suction pressure $P_s$) connected through lines 11 and 12 to the interior of the chamber 10 so that a constant relationship, such as a pressure difference $(P_1-P_3)$ may be maintained between the pressure $P_3$ in the chamber 10 and the atmospheric pressure $P_1$. The suction pressure $P_s$ may be obtained conveniently in aircraft from a Venturi tube in the external air stream. Suction pressures obtained in this manner may be of the order of five inches of mercury or more below the prevailing barometric or atmospheric pressure $P_1$.

For mechanical simplicity it is assumed in the present embodiment that the atmospheric pressure $P_1$ surrounds the apparatus. In practice this could be obtained by covering those parts susceptible to the surrounding pressure and conducting the pressure $P_1$ to the cover as in Figure 1.

The pressure $P_3$ is varied to maintain the pressure difference $(P_1-P_3)$ constant by providing a restriction 18 in the suction line 11, and then varying the pressure in the line 12 leading to the chamber 10 in accordance with the difference in pressure between the atmospheric pressure $P_1$ and the chamber pressure $P_3$. This is accomplished by providing a connection from line 12 to atmosphere through line 13 and a stationary nozzle or relief port 14 supported on a bracket 15 carried by the chamber 10. Cooperating with the nozzle 14 is a baffle 16 carried by the free end of a detecting bellows 17 suitably supported by the chamber 10 and opening into it. Thus the bellows 17 responds on the outside to the atmospheric pressure $P_1$ and on the inside to the pressure $P_3$, and so is made to respond to the pressure difference $(P_1-P_3)$. By providing the restriction 18 in line 11 ahead of the nozzle 14, the pressure in the line 12 may be varied over wider limits and the nozzle may be made smaller and the baffle more sensitive. Such a nozzle and baffle construction is so sensitive in its operation that minimum pressure is obtained in line 12 when the baffle touches the nozzle and maximum pressure is obtained in line 12 when the baffle is moved only one-thousandth of an inch from the nozzle.

With this construction the bellows 17 expands and contracts to cover and uncover the nozzle 14 to control the pressure in the line 13 and in the chamber 10 so that the baffle 16 is always in juxtaposition to the nozzle 14, i. e., is always maintained within a thousandth of an inch proximity to the nozzle. The operation may be outlined as follows: If $P_1$ increases or starts to increase and the pressure difference $(P_1-P_3)$ consequently increases or starts to increase, the pressure on the bellows 17 increases, causing it to contract to uncover the nozzle 14, and the pressure in the lines 13 and 12 starts increasing with the result that the pressure $P_3$ in the chamber 10 and in the bellows 17 increases to reduce the pressure difference and move the baffle 16 back to juxtaposition to the nozzle. In this manner the pressure $P_3$ is caused to increase in exact proportion to the increase in pressure $P_1$. Likewise, if $P_1$ starts to reduce, as when an aircraft starts ascending, bellows 17 expands due to the reduction in the pressure difference $(P_1-P_3)$. The baffle, therefore, moves closer to cover the nozzle causing the pressure in lines 13 and 12, and in the chamber 10, to start reducing so that $P_3$ is caused to reduce at the same rate that $P_1$ is reducing. This action is so rapid that an essentially constant pressure difference $(P_1-P_3)$ is maintained, the deviation from the constant being acted upon while it exists as a rate rather than a measurable quantity.

The fixed relationship that is thus maintained at all times between the pressure $P_1$ and the pressure $P_3$ may be determined by selection of the spring characteristics of the detecting bellows 17. Thus if the bellows has zero spring characteristic the pressure difference maintained would be zero. In the present embodiment, however, a bellows with a relatively stiff spring characteristic is used so that the pressure difference has a positive finite value. The position of the nozzle 14 with respect to the baffle 16 may be varied by adjusting the nozzle toward or away from the baffle and in this way the pressure difference $(P_1-P_3)$ may be adjusted to be half of the maximum suction pressure, or any other fraction of it desired. If the instrument is adjusted so that the pressure difference is half way between the maximum and minimum suction pressures then the instrument has the same potential to give the pressure $P_3$ a rate of increase as it has to give the pressure $P_3$ a rate of decrease.

The potential or the flow of air to and from the chamber 10 necessary to maintain the pressure $P_3$ in linear relationship with the atmospheric pressure $P_1$ is measured by providing a measuring restriction 19 in the line 12. The restriction 19 is of such a size that with the available change of pressure in $P_4$ the pressure $P_3$ is caused to follow the largest rate of change likely to be encountered in atmospheric pressure $P_1$, whereby the pressure difference $(P_1-P_3)$ is maintained constant. This restriction provides a pressure difference between the pressure $P_4$ in line 12 and that of $P_3$ existing in the chamber 10 so long as there is flow into or out of the chamber, and the flow into or out of the chamber 10 is proportional to this pressure difference. This pressure difference is measured by an indicating spring-loaded bellows 20 connected to line 12 so that the pressure $P_4$ in the bellows 20 is the same as that existing in the lines 12 and 13. The bellows 20 is made responsive to the pressure $P_3$ and so to $(P_4-P_3)$ by mounting the bellows in the chamber 10.

Since the indicating bellows 20 indicates the rate of flow into or out of the chamber 10, and since the rate at which the pressure $P_3$ in the chamber 10 changes is proportional to the rate of flow into or out of it, the indicating bellows 20 indicates the rate at which $P_3$ changes. Since, as above described, $P_3$ is maintained in a fixed linear relationship with the atmospheric pressure $P_1$, the indicating bellows 20 therefore indicates the rate at which the atmospheric pressure $P_1$ changes.

The condition of the indicating bellows 20 is indicated by a pointer 21 supported inside the casing on a support 22 and cooperating with an index 23. A link 24 connects the free end of the indicating bellows 20 and the pointer 21. The portion of the chamber 10 in front of the pointer 21 is made transparent so that the pointer may be viewed. Whereas in Figure 2 the bellows 20 is made to respond to the pressure difference $(P_4-P_3)$, it might also be made to respond to the pressure difference $(P_4-P_1)$ by exposing the outside of bellows 20 to the atmosphere and this pressure difference might be calibrated to indicate rate of climb.

Referring to Figure 3, another embodiment of the invention is shown in which several features are included which improve and extend the operation over that obtained under some conditions by the apparatus shown in Figure 2. Thus, for example, in most practical forms of such an apparatus as shown in Figure 2 a proportioning effect is introduced by the operation of the baffle and nozzle, which proportioning effect may cause a variation in the relationship maintained between the pressure $P_3$ and the atmospheric pressure $P_1$ for different values of the atmospheric pressure, and for different values of the suction pressure $P_s$. This is overcome in the embodiment of Figure 3 by a relay system. The relay system also permits the baffle operating bellows to be made stiff so that errors due to the effects of gravity and inertia are eliminated. Also, sudden variations in the suction pressure $P_s$, which under practical operating conditions are almost inevitable, are eliminated by providing a pressure regulator in the suction line. The relay system also reduces the effect that sudden change of suction pressure would otherwise have on the measurement. In Figure 3, provision is made for obtaining the true barometric or atmospheric pressure instead of making the detecting bellows responsive as in Figure 2 to the cockpit pressure which frequently differs from the atmospheric pressure. And, since the tubing for conveying such a static pressure to the instrument introduces a lag between the true barometric pressure and the barometric pressure as received at the instrument, means are provided for compensating for this lag and for removing its effects.

Referring to Figure 3, the suction pressure $P_s$, instead of being connected directly to the restriction 18 and nozzle 14, is connected through a spring-loaded bellows 25 and a port 26 located within the bellows. The connecting tube 11a connects the bellows 25 with the restriction 18 and the nozzle 14. The bellows 25 is exposed to approximately barometric pressure on the outside so that it responds to the difference between the approximately barometric ambient pressure $P_{1_a}$ and the suction pressure $P_{s_1}$ within the bellows. It is provided with a spring characteristic such as to close off the port 26 when the pressure difference goes below a predetermined value $(P_{1_a}-P_{s_1})$ and to expand to open the port 26 when the pressure difference rises above the value $(P_{1_a}-P_{s_1})$. Thus a substantially constant relative suction pressure is maintained in the line 11a.

Instead of using nozzle 14 as the relief port by which the operating pressure $P_4$ is varied, the pressure back of the nozzle 14 as varied by the operation of the baffle 16 operates a relay valve generally indicated at 27. The relay valve comprises a spring-loaded bellows 27 communicating with the pressure back of the nozzle 14 and carries a baffle 29 adapted to control the opening of a relief port or nozzle 30 provided in the line 12. This relief port 30 has a larger area than the nozzle 14 and so can vary the pressure in line 12 more rapidly than could the nozzle and baffle of Figure 2. A second, and larger-bore, resistance 18a is provided in the line 11a so that the pressure in line 12 may be manipulated more conveniently by the operation of the baffle 29.

With this construction the "proportioning" effect of the baffle and nozzle may by logical design be eliminated by making the relay valve so sensitive that for all practical purposes it is always moving toward an open or a closed position but so fast that the resulting pulsations in the instrument are not indicated. Thus, as the valve 27 is tending to close off, the pressure response is felt by the baffle 16 so quickly that before the pressure has a chance to decrease to any visible extent beyond its proper value the baffle 16 causes the relay valve to throw in the reverse direction. Likewise the response of the baffle 16 to the resulting pressure increase is so fast that the relay valve starts to throw in the reverse direction before any visible change in pressure above its proper value is indicated. So with this construction the pressure difference $(P_1-P_3)$ is effectively maintained substantially constant throughout the whole range of the instrument.

The indicating bellows 20 and the measuring restriction 19 is the same as that shown in Figure 2.

Whereas the suction control valve serves to maintain the overall suction pressure approximately constant it does not eliminate sudden changes in the suction supply pressure. In the present embodiment of the invention, however, the relay valve 27 eliminates the effect of such sudden changes in the suction pressure on the reading of the instrument. The relay valve accomplishes this result by increasing or decreasing the pressure $P_4$ to compensate for decrease or increase in the suction pressure $P_{s_1}$. The operation of this compensation may be traced as follows: Assuming the pressures $P_4$ and $P_3$ to be balanced, if the pressure $P_{s_1}$ suddenly decreases (i. e. the suction becomes greater), it will have the double effect of trying to reduce the pressure $P_4$ and of reducing the pressure back of the nozzle 14. But this latter reaction causes the bellows 28 of the relay valve to contract to uncover further the nozzle 30, and hence independently to increase $P_4$. The opposite reaction takes place if the pressure $P_{s_1}$ suddenly increases.

The barometric or atmospheric pressure is brought to the instrument, as in Figure 1, through a head 3 and line 2. Line 2 connects with one side 31 of a differential pressure detecting bellows generally indicated as 32. The other bellows 33 is connected through a line 34 with the pressure $P_3$ in the chamber 10. The baffle 16 is mounted between the movable ends of the bellows 31 and 33 and so responds to the pressure difference in the bellows. The pressure in the bellows 31 is approximately that of the true atmospheric pressure $P_1$ existing at the head 3 but because of the distance in length of duct that separates the bellows 31 from the place of measurement of the atmospheric pressure, the pressure in the bellows 31 actually lags behind the pressure $P_1$ if the latter is changing and so the pressure in the bellows 31 will be designated as $P_5$.

To offset the effect of this lag a restriction 35 is provided in the line 34 between the chamber 10 and the bellows 33 so that the pressure $P_3$ always leads the pressure $P_6$ in bellows 33 so long as the pressure $P_6$ is caused to have a rate of change. In other words, providing this restriction has the effect of causing the pressure $P_3$ to be changed to a greater extent than it would otherwise be changed to follow a corresponding change in $P_1$. In this manner, since the pressure $P_5$ in the bellows 31 always lags behind the changing pressure $P_1$, the excess correction to the pressure $P_3$ caused by the resistance 35 makes the pressure $P_3$ follow the pressure $P_1$ instead of the pressure $P_5$. The value of the resistance 35 is selected so that the time constant of the resistance 35 and its associated volume (bellows 33) effectively equals the time constant of the resistance of line 2 and its associated volume. The proper amount of resistance may be empirically obtained by connecting the atmospheric end of tube 2 and the bellows 33 through the restriction 35 to a common pressure chamber. The resistance 35 is then varied until, following a change in pressure in the chamber, no difference in pressure occurs between pressures $P_5$ and $P_6$.

This instrument thus is adapted to indicate accurately the changing barometric pressure. Whereas it is not shown as corrected for temperature conditions as may be desirable in some instances when used for aircraft, it does give an accurate indication of the rate at which the barometric pressure is changing and if the rate of change of atmospheric pressure is due to the rate of change of altitude the instrument indicates the rate of change of altitude.

As shown in Figure 3, the apparatus may also be used as an improved indication of barometric pressure and so of altitude by making an exhausted or aneroid bellows 36 responsive solely to the pressure $P_3$ in the chamber 10. By adjusting the spring characteristic of such a bellows, the bellows may be calibrated to indicate the pressure $P_1$ instead of the pressure $P_3$. Using the pressure $P_3$ to operate an altitude indicating bellows has the advantage that the lag in the pressure due to the restriction in the line 2 is eliminated in the pressure $P_3$ and so this error which is usually present in altimeters is eliminated.

The aneroid bellows 36 may be located within the chamber 10, or, as shown in Figure 3, may be mounted in a chamber 10a connected to the chamber 10 by a line 37. As shown, the bellows 36 is mounted on a suitable support 38. Through a connection 39 it operates an indicating pointer 40 cooperating with an index 41. As before, the chamber 10a is provided with a transparent portion so that the pointer 40 and scale 41 may be viewed.

We have assumed above the use of suction pressure to operate the instrument, i. e., a pressure below and related to the existing atmospheric pressure. If desired, however, the instrument may be made to operate on a positive pressure, i. e., one above atmosphere. This would require only the reversing of the operation of the nozzle 14 with respect to the baffle of Figure 2 to cause an increase of pressure in bellows 17 to uncover the nozzle. No change would be required in the structure of Figure 3 except a new adjustment of the nozzles 14 and 30.

From the foregoing description it is evident that with the proper selection of values for the various pneumatic capacities of the parts and the various restrictions an instrument may be built to indicate accurately the instantaneous rate of climb, or the instantaneous altitude, or both. Care must be exercised, however, to select the values above mentioned in accordance with known laws of pneumatically operated instruments. This may conveniently be done by setting up the equation of the instrument and calculating the values necessary to make it operate as above described, i. e., in such a manner that it at all times functions to maintain the pressure $P_3$ in the desired relationship with respect to the atmospheric pressure whether the atmospheric pressure has a rate of change or not. Also the value of the measuring resistance 19 should be selected so as not to interfere with the maintenance of the pressure $P_3$ but at the same time should be sufficient to provide the desired pressure difference between $P_4$ and $P_3$ necessary for accurate measurement or control.

The apparatus of the present invention is particularly adapted to control rate of climb (or altitude) of aircraft.

Referring to Figure 4, a novel controller embodying the present measuring instruments for controlling the altitude or rate of climb or descent of aircraft is shown. The instrument comprises the rate of climb measuring apparatus diagrammatically shown in Figure 3, a pressure responsive follow-up mechanism generally indicated at 50 and responsive to the pressure difference ($P_3 - P_4$), a servo-motor mechanism generally indicated at 51 adapted to operate suitable rate or altitude changing means such as an elevator generally indicated at 52. The pressure responsive mechanism 50 comprises two sets of opposing bellows generally indicated at 53 and 54. The opposing bellows 53 comprises a bellows 55 and a bellows 56 respectively supported in a framework 57 at their far ends. The movable adjacent ends of the bellows react against one end of a torque lever 58. The other set of opposing bellows 54 comprises a bellows 59 and a bellows 60 mounted in the same manner that the bellows 55 and 56 are mounted and carrying between their adjacent ends the other end of the torque lever 58. The bellows 55 is connected through a line 55a with the pressure $P_4$ and the bellows 59 is connected through line 59a with the pressure $P_3$ so that the respective pressures $P_4$ and $P_3$ are maintained at all times in the respective bellows 55 and 59.

These pressures effectively act against an adjustable spring system which is manually adjustable to adjust the controller to maintain the desired rate of climb or descent. The spring system in the present embodiment comprises compression springs 61 and 62 respectively mounted between opposing arms of the torque lever 58 and the opposing arms 63 and 64 of an adjustable setting lever 65. The lever 65 is pivoted at 65a and the torque lever 58 is pivoted at 72.

With this construction the effect of the pressure $P_4$ in bellows 55 opposes the effect of the pressure $P_3$ in the bellows 59 and the spring system can be manually adjusted either to impart a moment to the torque lever 58 in favor of the bellows 55 or to impart a torque moment to the torque lever 58 in favor of the bellows 59. In other words, the bellows 55 and 59 oppose each other and the springs 61 and 62 are adjustable to change the effect of one bellows on the other for any given pressure difference ($P_4-P_3$).

Bellows 56, opposing bellows 55, and bellows 60, opposing bellows 59, are force balancing bellows and operate as a "follow-up" mechanism. Auxiliary pressure is supplied to bellows 56 and 60 in such manner as at all times to just balance the effect of the pressures ($P_3-P_4$) and of the spring system to maintain the torque lever 58 in a substantially neutral position. As will be described, this same auxiliary pressure is used to regulate the position of the elevator 52.

The auxiliary pressure ($P_6$) supplied to the bellows 56 and the auxiliary pressure ($P_7$) supplied to the bellows 60 is controlled by a double nozzle, single baffle mechanism comprising a baffle 66 and nozzles 67 and 68. The nozzles are connected through lines 69 and 70 and resistances 69a and 70a with the suction pressure $P_5$. The output or back pressure of the nozzles as manipulated by the baffle 66 is connected respectively through lines 71 and 71a with bellows 56 and 60.

The baffle 66 is loosely mounted on a shaft 72 on which the torque lever 58 is suitably mounted and is operated through oppositely disposed resilient stops 73 and 74 mounted on the hub 75 of the torque lever 58. With this construction the slightest movement of the torque lever is transmitted to the baffle 66, but if the movement is greater than that permitted by the nozzles 67 or 68 the resilient stops 73 and 74 yield to prevent straining of the parts. One of the stops 73, 74 is positively located in its normal position so that the baffle 66 under normal conditions is held in a definite position with respect to the torque lever 58.

The construction of the baffles and nozzles is such as described in connection with Figures 2 and 3 and such that only a slight movement of the baffle is required to move it through its operating range to cause maximum pressure change back of the nozzles. It is preferably designed so that when the baffle is in neutral position equal pressures tend to build up back of the respective nozzles. The equal pressures thus established are preferably about half-way between the minimum pressure that tends to build up back of the nozzle when covered by the baffle and the maximum pressure that tends to build up back of the nozzle when completely uncovered by the baffle. The position relationship between the torque lever and the baffle is such that the torque lever holds the baffle within its operating range, as described so long as the torque lever is in its neutral position.

The baffle 66, being responsive to the output pressures of the nozzles through the bellows 56 and 60 and torque lever 58 establishes a pneumatic "follow-up" system by which the operating pressures $P_6$ and $P_7$ in the bellows 56 and 60 always balance the variable pressures $P_3$ and $P_4$ and the adjustable effect of the springs 61 and 62 so that the torque lever is held stationary in its neutral position except for slight movements necessary to move the baffle 66 through its small operating range. In other words, the pneumatic follow-up system constitutes a force balancing system in which the pressures $P_6$ and $P_7$ are maintained at whatever values are necessary to counterbalance the effects of the varying pressures $P_3$ and $P_4$. Thus the pressures $P_6$ and $P_7$ vary respectively and in direct proportion to the variation in the values of the pressures $P_4$ and $P_3$. If the springs 61 and 62 are so adjusted as to exert equal and opposite forces on the torque lever 58, the pressure difference between $P_6$ and $P_7$ equals whatever pressure difference exists between $P_3$ and $P_4$ and when the aircraft has zero rate of climb or descent, the pressure difference ($P_4-P_3$) is zero and the pressure difference ($P_6-P_7$) is zero. If under this condition of adjustment the aircraft acquires a rate of change such as, for example, a rate of descent then, as above described, pressure $P_4$ becomes greater than pressure $P_3$ and the pressure difference between them is proportional to the rate of descent. As the pressure difference ($P_4-P_3$) changes from zero to its new value, the pneumatic follow-up system causes pressure $P_6$ to increase and pressure $P_7$ to reduce to establish a pressure difference equal to that of ($P_4-P_3$) to maintain the torque lever 58 in its neutral position. The reverse action takes place if the aircraft assumes a rate of climb.

The output pressures $P_6$ and $P_7$ of the two nozzles in addition to being used to establish the pneumatic feed-back system are also used to operate the differential or servo-motor 51. The pressure $P_6$ back of the nozzle 67 is conducted to one side of the differential motor through a line 76 and the differential pressure $P_7$ back of the nozzle 68 is conducted to the other side of the differential motor through a line 77. The differential motor may be of any desired type and, as diagrammatically illustrated, comprises two spring-loaded bellows 78 and 79 covered respectively by covers 80 and 81. The bellows support a common shaft 82 connected mechanically through a yoke to operate a lever 83 which in turn is suitably mechanically connected to operate the elevator 52. With this construction, therefore, the position of the elevators is made a function of the difference between the output pressures $P_6$ and $P_7$ and in turn a function of the value of the pressure difference ($P_4-P_3$).

When the pressure difference is zero the elevator may be adjusted to assume a neutral position, but the servo-motor operates the elevator so that when the pressure difference ($P_4-P_3$) becomes negative the elevators tilt in one direction from neutral an amount which is a function of the pressure difference and when the pressure difference becomes positive the elevators tilt in the opposite direction.

Still considering the above adjustment, i. e., with the springs 61 and 62 exerting equal and opposite force on the torque lever, it is evident that if the aircraft for some reason tries to assume a rate of descent, the resulting increase of the pressure difference ($P_4-P_3$) causes the pressure $P_6$ to increase and the pressure $P_7$ to decrease causing the bellows of the differential motor to move to the right with the result that the elevator is tipped to check the tendency of the aircraft to assume a rate of descent. The reverse action takes place if the aircraft tries to assume a rate of climb. The controller with this adjustment therefore tries to give the aircraft minimum rate of climb or descent.

To adjust the controller thus described to give the aircraft a rate of descent, the handle 65b of the spring-loading mechanism is moved clockwise, as shown in Figure 4, to cause the spring system to put an unbalanced moment on the torque lever. This operation changes the equal or one-to-one relationship maintained by the follow-up system between the pressure difference $(P_4-P_3)$ and the pressure difference $(P_6-P_7)$, and thus changes the functional relationship between the pressure difference $(P_4-P_3)$ and the position of the elevator.

In other words, loading the torque lever 58 unevenly to give it a moment in the clockwise direction changes the pressure difference $(P_6-P_7)$ otherwise required to balance a given pressure difference $(P_4-P_3)$ a value proportional to the unbalanced moment. The pressure difference $(P_6-P_7)$ which is thus caused to exist operates the elevator 52 to give the aircraft a rate of descent. As the aircraft assumes a rate of descent, however, the pressure difference $(P_4-P_3)$ increases in proportion to the rate of descent and other conditions being equal the pressure differences $(P_4-P_3)$ and $(P_6-P_7)$, although now unequal, balance at a value which is a function of the setting of the spring system and the aircraft is given a rate of descent which is a function of the setting of the spring system. Also, other conditions being equal, as the torque lever is loaded to give it a larger moment, the rate of descent is increased and as it is loaded less unevenly the rate of descent is decreased. Likewise, as the torque lever is loaded unevenly in the reverse sense the aircraft is given a rate of rise which is a function of the spring-loading.

As described in connection with the adjustment for zero rate of climb or descent, if the controller is adjusted, for example, to give the aircraft the rate of descent and the aircraft tends to descend more rapidly than the adjustment calls for, the pressure difference $(P_4-P_3)$ increases over that which is normal for the adjustment, causing the pressure difference $P_6-P_7$) to increase with the result that the elevator 52 is operated to check the increased rate of descent. The reverse action takes place if the rate of descent slows down. Thus the controller tends to maintain a steady rate of descent or rise, as the case may. The controller, therefore, manipulates the elevator 52 to maintain the desired rate of rise or descent which is a function of the moment imparted to the torque arm by unequally loading the springs 61 and 62 which itself is determined by the adjustment of the handle 65b.

In Figure 5, the controller is shown connected up to manipulate the elevator to maintain a desired altitude. To this end, either the pressure $P_4$ or $P_3$ ($P_4$ as shown) is connected to the bellows 55, but the bellows 59 is replaced by an adjustable spring 84. The bellows 56 and 60 are provided as before and the pneumatic feed-back system is the same as in Figure 4. With this construction, when the force exerted by the pressure $P_4$ on the torque lever 58 equals that exerted by the spring 84 the pressure difference $(P_6-P_7)$ is zero and the pressures $P_6$ and $P_7$ are equal and the elevator 52 is in its neutral position. When the pressure $P_4$ is steady it is proportional to the existing atmospheric pressure and when corrected for barometric conditions is proportional to the altitude. Under such conditions, an aircraft on which the controller is installed would be flying at an altitude proportional to the pressure $P_4$. If, however, the aircraft starts to lose altitude, the pressure $P_4$ instantly increases, as above described, and causes the pressure in bellows 56 to increase proportionally and the pressure in the bellows 60 to decrease proportionally with the result that the elevator 52 is adjusted to check the descent.

The altitude at which the aircraft is thus controlled is adjustable by adjusting the compression of the spring 84 as by adjusting the threaded screw 85 supporting an adjustable support 86 of the spring 84. If, for example, the spring pressure is increased, the reaction of the pneumatic feed-back system is such that the pressure in bellows 60 increases and the pressure in bellows 56 decreases with the result that the elevator is adjusted to cause the aircraft to descend. But as it descends, the pressure $P_4$ increases until eventually the force exerted by $P_4$ on the torque lever 58 balances that exerted by the spring 84 so that the controller now manipulates the elevator to maintain the aircraft at a lower altitude than that maintained by the previous adjustment.

The rate of climb or descent controller and the altitude controller thus described have the advantage of being immediately responsive to changes in altitude or to rate of change of altitude and so are adapted to manipulate the elevator or other mechanism influencing rate of climb or descent to maintain the desired condition of flight of the aircraft. A further advantage of the controller as an altitude controller is that by making the controller responsive to the pressure $P_4$ quantitative corrective changes in the elevator position are made not only in response to the departure of the aircraft from the desired altitude, but also in response to the rate of change of the altitude.

We claim:

1. Apparatus for measuring the rate of change of atmospheric pressure as, for example, that due to changing altitude comprising, in combination, a pressure chamber, a source of suction pressure a connection between said source and pressure chamber, valve means for controlling the flow of said suction pressure to and from said chamber to maintain the pressure therein in a predetermined relationship to said atmospheric pressure, restriction means between said valve means and pressure chamber to cause a suction pressure differential to exist so long as there is flow to or from said chamber, and means for measuring the suction pressure differential required to maintain said relationship.

2. Apparatus for measuring the rate of change of atmospheric pressure as, for example, that due to changing altitude comprising, in combination, a pressure chamber, a source of suction pressure, a connection between said source and said pressure chamber, means for controlling the flow of said suction pressure to and from said chamber to maintain the pressure therein in a predetermined relationship to said atmospheric pressure, a measuring restriction in said connection between said controlled flow of suction pressure and said pressure chamber for measuring the pressure difference required to maintain said relationship, and means responsive to the pressure drop across said restriction, said means being calibrated to translate said pressure drop into rate of change of the atmospheric pressure.

3. Apparatus for measuring the rate of change of atmospheric pressure, such as, for example, that caused by changing altitude of an aircraft, comprising, in combination, a pressure chamber, a source of suction pressure, a connection between said source and said pressure chamber, means responsive to said atmospheric pressure and to pressure in said pressure chamber for controlling the flow of said suction pressure to and from said pressure chamber to maintain the pressure therein in a predetermined relationship to said atmospheric pressure, and a metering orifice in said connection between said source and said pressure chamber for establishing a pressure differential which is a function of the flow required to maintain said relationship, and means continuously responsive to the value of said pressure differential.

4. Apparatus for measuring the rate of change of barometric pressure such as, for example, that caused by changing altitude of an aircraft, comprising, in combination, a pressure chamber, a source of auxiliary pressure, a connection between said source and said pressure chamber, control means for controlling the flow of pressure to and from said pressure chamber to maintain the instantaneous value of the pressure in said chamber in a predetermined relationship to the instantaneous value of the barometric pressure, said control means including oppositely acting expansible members respectively connected through balanced restrictions to the pressure chamber and to a barometric pressure head, and a restriction to said flow of pressure in said connection between said source and said pressure chamber for creating a pressure differential which is a function of the flow required to maintain said relationship whereby said differential may be utilized as a measure of the rate of change of barometric pressure, and means continuously responsive to the value of said pressure differential.

5. In apparatus for measuring the rate of change of pressure such as that caused by the changing altitude of aircraft, in combination, a pneumatic capacity, a source of auxiliary pressure, a line leading from said source of auxiliary pressure to said pneumatic capacity, control means for controlling the flow of pressure to and from said pneumatic capacity including a restriction in said line, a port to atmosphere in said line beyond said restriction, a valve for said port, mechanism for operating said valve, said mechanism being responsive to the effective pressure difference between the pressure in said pneumatic capacity and the barometric pressure whereby said valve controls the operating pressure back of said port to maintain the pressure in said pneumatic capacity in a predetermined relationship with respect to said barometric pressure, a restriction in said line beyond said port for establishing a pressure difference between the pressure in said pneumatic capacity and the operating pressure in said line, which pressure difference is a function of the flow required to maintain the pressure in said pneumatic capacity and means responsive to the pressure difference for indicating the value of the rate of change of altitude.

6. In apparatus for measuring the rate of change of altitude of aircraft by measuring the rate of change of the barometric pressure comprising, in combination, a pneumatic capacity, a source of auxiliary pneumatic pressure, a connection between said source of auxiliary pressure and said pneumatic capacity, control means for controlling the flow of pressure to and from said pneumatic capacity, said control means including a restriction in said connection, a port to atmosphere in said connection beyond said restriction, a valve for said port, means for operating said valve including a relatively stiff spring-loaded bellows responsive on one side to the pressure in said pneumatic capacity and on the other side to the barometric pressure and adapted to operate said valve to maintain an operating pressure back of said port such as to maintain a predetermined pressure difference between the pressure in said pneumatic capacity and said barometric pressure, a restriction in said connection beyond said port for establishing a pressure difference between the pressure in said pneumatic capacity and the operating pressure in said connection so long as there is flow between the two pressures, and means responsive to the pressure difference for indicating the value of the rate of change of altitude as indicated by said pressure difference.

7. In apparatus for measuring the rate of change of altitude of aircraft by measuring the rate of change of the barometric pressure comprising, in combination, a pneumatic capacity, a source of auxiliary pneumatic pressure, a connection between said source of auxiliary pressure and said pneumatic capacity, control means for controlling the flow of pressure to and from said pneumatic capacity, said control means including a restriction in said connection, a port to atmosphere in said connection beyond said restriction, a valve for said port, means for operating said valve including a relatively stiff spring-loaded bellows responsive on one side to the pressure in said pneumatic capacity and on the other side to the barometric pressure; a second restriction in said connection, a second and larger port to atmosphere in said connection beyond said second restriction, a valve for said port, a spring-loaded bellows for operating said valve and responsive to the pressure back of said first port as manipulated by said first bellows, said second port and valve acting as a relay valve controlling the operating pressure determining the flow to and from said pneumatic capacity whereby a predetermined pressure difference is maintained between the pressure in said pneumatic capacity and the barometric pressure, a restriction in said connection for establishing a pressure difference between the pressure in said pneumatic capacity and the operating pressure in said line so long as the pressure in said pneumatic capacity has a rate of change, and a spring-loaded bellows responsive to the pressure difference for indicating the value of the rate of change of altitude as indicated by said pressure difference.

8. Apparatus responsive to barometric pressure for measuring altitude of aircraft comprising, in combination, a pneumatic capacity, a source of auxiliary pressure, a connection between said source of auxiliary pressure and said pneumatic capacity, control means for controlling the flow of pressure to and from said pneumatic capacity including a port to atmosphere in said connection, a valve for said port, means for operating said valve including a first bellows connected to said pneumatic capacity, a second bellows opposing the control action of the first bellows and connected to a barometric static head through an unavoidable restriction, and a restriction between said first bellows and said pneumatic capacity to offset the lag caused by the unavoidable restriction whereby said control means maintains the instantaneous value of the pressure of said pneumatic capacity in a predetermined relationship with the instantaneous value of said barometric pressure, and means proportionally responsive to the pressure in said pneumatic capacity for indicating the altitude.

9. Apparatus responsive to barometric pressure for measuring altitude and rate of change of altitude of aircraft comprising, in combination, a pneumatic capacity, a source of auxiliary pressure, a connection between said source of auxiliary pressure and said pneumatic capacity, control means for controlling the flow of pressure to and from said pneumatic capacity including a port to atmosphere in said connection, a valve for said port, means for operating said valve including a first bellows connected to said pneumatic capacity, a second bellows connected to a barometric pressure head through an unavoidable restriction, and a restriction between said first bellows and said pneumatic capacity to offset the lag caused by the unavoidable restriction whereby said control means maintains the instantaneous value of the pressure of said pneumatic capacity in a predetermined relationship with the instantaneous value of said barometric pressure, means proportionally responsive to the pressure in said pneumatic capacity for indicating the altitude, and means for effectively measuring flow to and from said pneumatic capacity and for indicating as a result of said measurement the rate of change of altitude.

10. Apparatus utilizing changing barometric pressure for measuring rate of change of altitude of aircraft comprising, in combination, a pneumatic capacity, a source of auxiliary pressure maintained at all times in a predetermined proportion with respect to the value of the barometric pressure, a connection between said source of auxiliary pressure and said pneumatic capacity, control means for controlling the flow of pressure to and from said pneumatic capacity, said control means including a restriction in said connection, a port to atmosphere in said connection, a valve for said port, means for operating said valve including a relatively stiff spring-loaded bellows responsive on one side to the pressure in said pneumatic capacity and on the other side to the barometric pressure; a second restriction in said connection, a second and larger port to atmosphere in said connection, a valve for said port, a spring-loaded bellows for operating said valve and responsive to the pressure back of said first port as manipulated by said first bellows, said second port and valve acting as a relay valve controlling the operating pressure determining the flow to and from said pneumatic capacity whereby a predetermined pressure difference is maintained between the pressure in said pneumatic capacity and the barometric pressure, a restriction in said connection beyond said second port for establishing a pressure difference between the pressure in said pneumatic capacity and the operating pressure in said line so long as said pneumatic capacity has a rate of change, and a spring-loaded bellows responsive to the pressure difference for indicating the value of the rate of change of altitude as indicated by said pressure difference.

11. In apparatus for controlling rate of change of altitude of aircraft in response to barometric pressure, in combination, a pressure chamber, a source of auxiliary fluid pressure, means for controlling the flow of said auxiliary pressure to and from said pressure chamber to maintain the instantaneous value of the pressure therein at a fixed value with respect to the instantaneous value of the barometric pressure, means responsive to the potential of the auxiliary pressure required to maintain such relationship for regulating the rate of change of altitude of the aircraft, said last-named means being manually adjustable to set the desired rate of change of altitude.

12. In apparatus for establishing a pneumatic control pressure for controlling aircraft in response to barometric pressure, in combination, a pressure chamber, a source of auxiliary fluid pressure, means for controlling the flow of said auxiliary pressure to and from said pressure chamber to maintain the instantaneous value of the pressure therein at a fixed value with respect to the instantaneous value of the barometric pressure, means responsive to the potential of the auxiliary pressure required to maintain such relationship, valve means for controlling the supply of air to establish said pneumatic pressure, and means responsive to the output pressure of said valve means, and in conjunction with said responsive means and in opposite sense thereto operating said valve means to establish said pneumatic control pressure.

13. In apparatus for establishing a pneumatic control pressure for controlling aircraft in response to barometric pressure, in combination, a pressure chamber, a source of auxiliary fluid pressure, means for controlling the flow of said auxiliary pressure to and from said pressure chamber to maintain the instantaneous value of the pressure therein at a fixed value with respect to the instantaneous value of the barometric pressure, means responsive to the potential of the auxiliary pressure required to maintain such relationship, valve means for controlling the supply of air to establish said pneumatic control pressure, means responsive to the output pressure of said valve means and in conjunction with said responsive means and in opposite sense thereto operating said valve means to establish said pneumatic control pressure, and means for adjusting the opposing relationship between said means responsive to the potential and said means responsive to the output pressure.

14. In apparatus for establishing a pneumatic control pressure controlling altitude of aircraft, in combination, a pressure chamber, a source of positive pressure, control means responsive to atmospheric pressure and to pressure in said pressure chamber for controlling the flow of said positive pressure to and from said pressure chamber to maintain the pressure therein in a predetermined relationship to said atmospheric pressure, and a restriction to said flow of positive pressure between said control means and said pressure chamber, valve means for controlling the supply of pressure to establish said pneumatic control pressure, means responsive to the pressure between said control means and said restriction for operating said valve means, and means responsive to the output pressure of said valve means and operating said valve means in opposite sense to said means responsive to the pressure between said control means and said restriction.

15. In apparatus for establishing a pneumatic control pressure controlling altitude of aircraft, in combination, a pressure chamber, a source of positive pressure control, means responsive to atmospheric pressure and to pressure in said pressure chamber for controlling the flow of said positive pressure to and from said pressure chamber to maintain the pressure therein in a predetermined relationship to said atmospheric pressure, and a restriction to said flow of positive pressure between said control means and said pressure chamber, valve means for controlling the supply of pressure to establish said pneumatic control pressure, means responsive to the pressure between said control means and said restriction for operating said valve means, means responsive to the outlet pressure of said valve means and operating said valve means in opposite sense to said means responsive to the pressure between said control means and said restriction and means for adjusting the operating relationship between said means responsive to the pressure between said control means and said restriction, and said means responsive to the operating output pressure of the valve means.

GEORGE A. PHILBRICK.
ALLAN R. CATHERON.

REFERENCES CITED

The following references are of record in the file of this patent:

UNITED STATES PATENTS

| Number | Name | Date |
| --- | --- | --- |
| Re. 19,276 | Wunsch | Apr. 14, 1934 |
| 1,664,417 | Hunt et al. | Apr. 3, 1928 |
| 1,690,455 | Paulin | Nov. 6, 1928 |
| 1,929,091 | Colvin | Oct. 3, 1933 |
| 1,934,375 | Reynolds et al. | Nov. 7, 1933 |
| 1,935,736 | Colvin | Nov. 21, 1933 |
| 2,091,300 | Bassett et al. | Aug. 31, 1937 |
| 2,142,338 | Sidwell | Jan. 3, 1939 |
| 2,143,140 | Carlson | Jan. 10, 1939 |
| 2,159,703 | Koch | May 23, 1939 |
| 2,171,265 | Carlson | Aug. 29, 1939 |
| 2,223,712 | Qiebolz | Dec. 3, 1940 |
| 2,240,243 | Mason | Apr. 29, 1941 |
| 2,250,344 | Alkan | July 22, 1941 |

Certificate of Correction

July 20, 1948.

Patent No. 2,445,335.

GEORGE A. PHILBRICK ET AL.

It is hereby certified that errors appear in the printed specification of the above numbered patent requiring correction as follows:

Column 6, line 8, for "bellows 27" read *bellows 28*; column 16, line 15, claim 12, after the word "pneumatic" insert *control*; column 17, line 4, claim 15, for "outlet" read *output*; column 18, line 15, under the references cited, for the name "Qiebolz" read *Ziebolz*;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*